INVENTOR
Norman W. Lyon
BY Chapin & Neal
ATTORNEYS

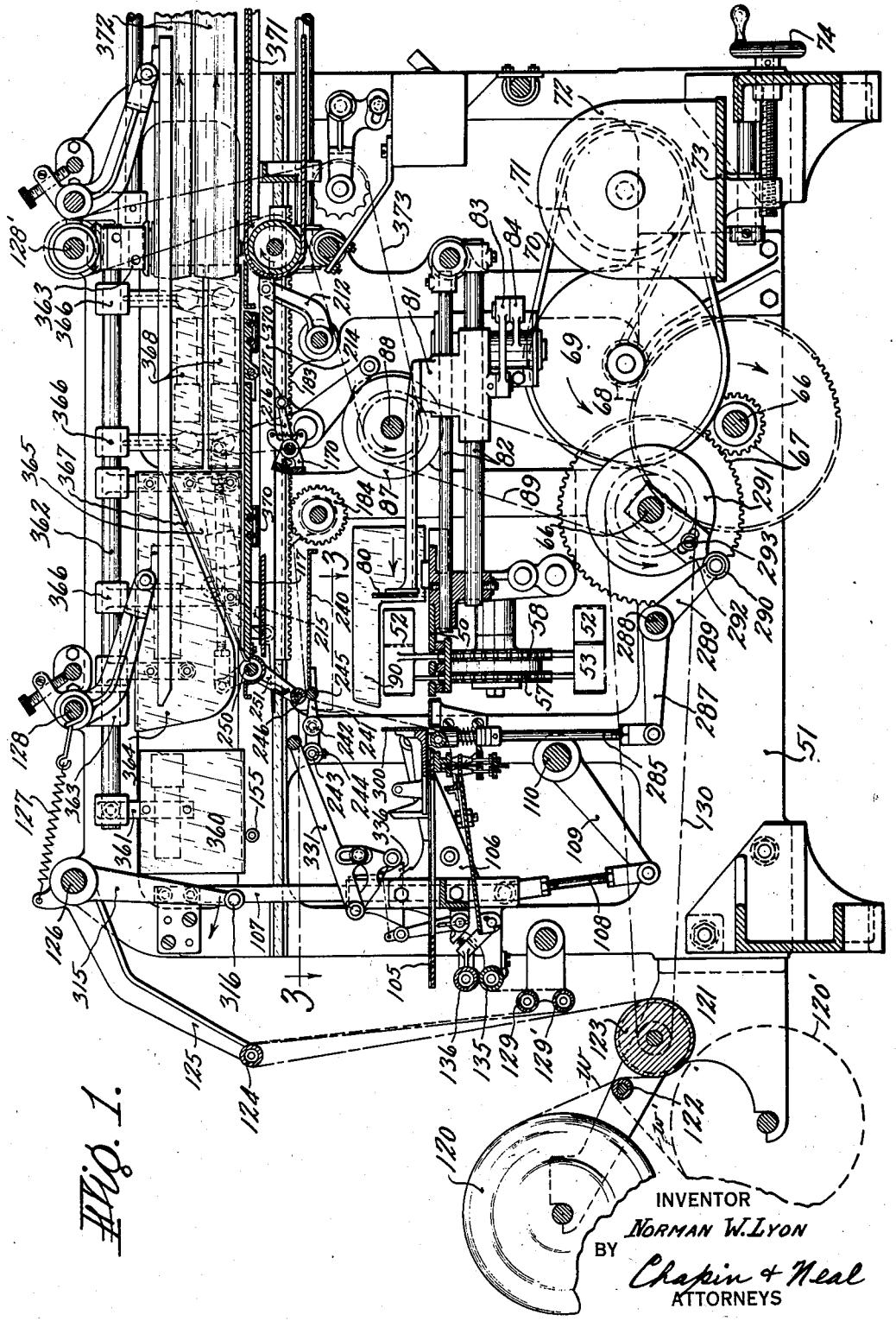

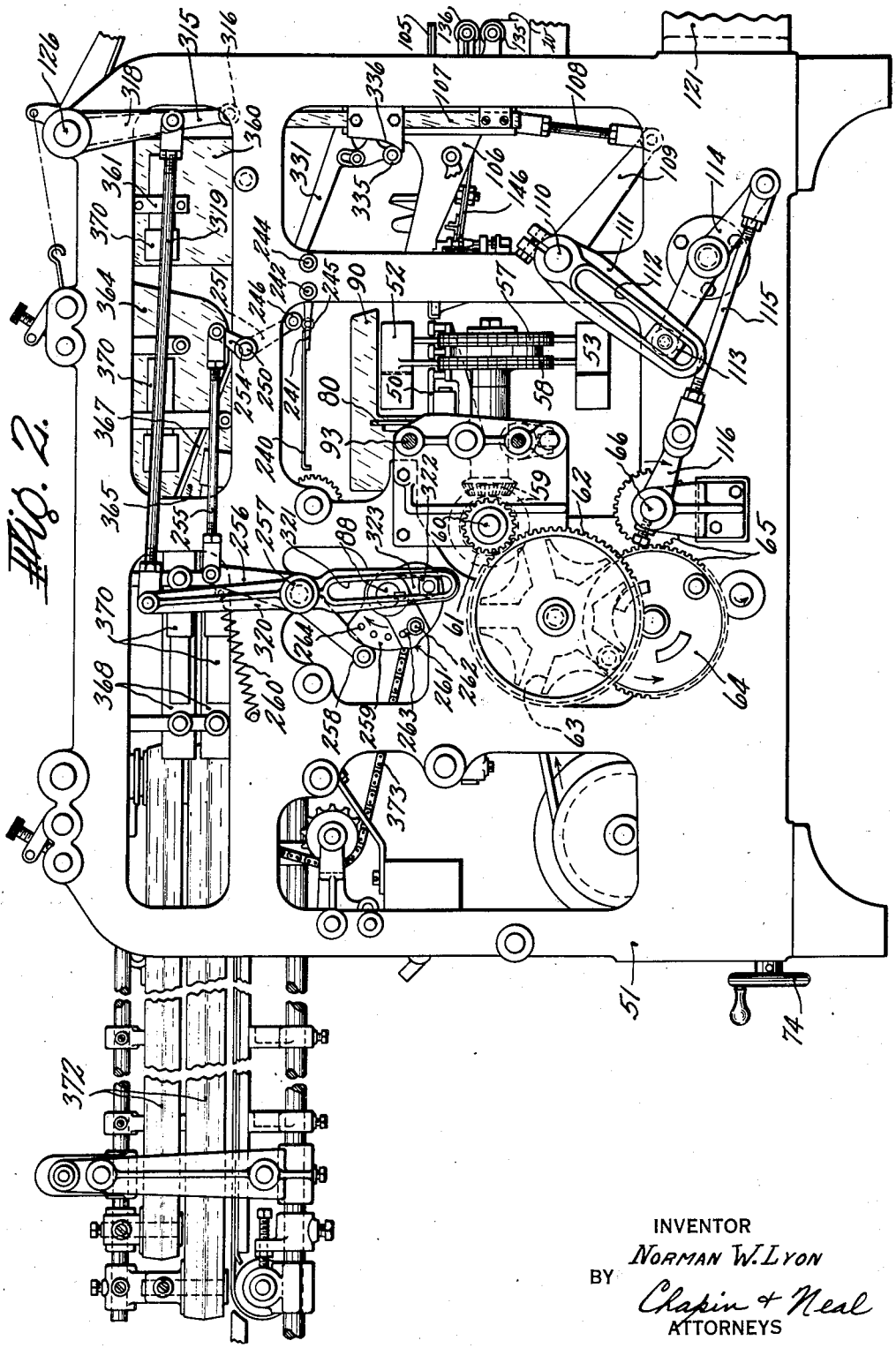

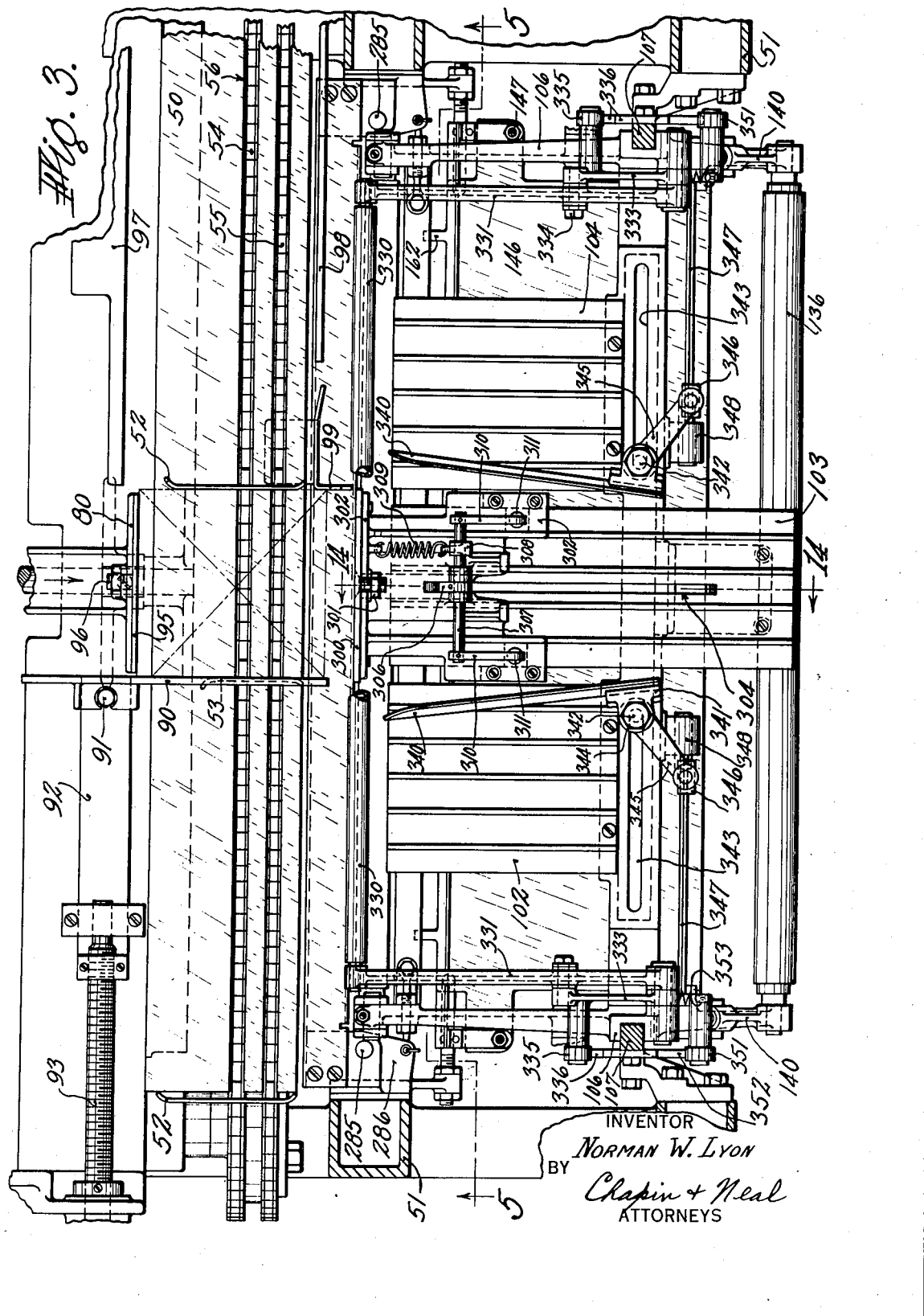

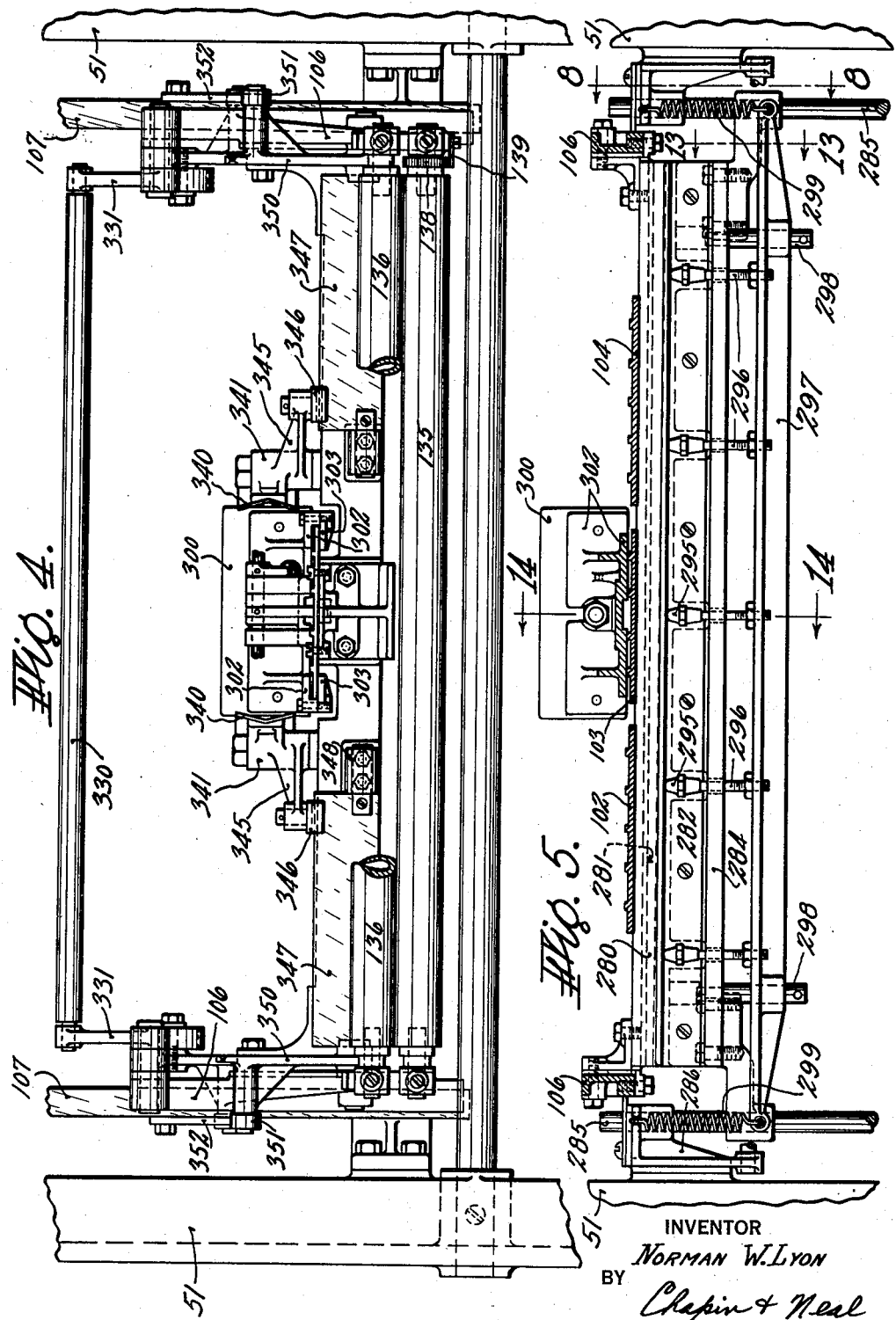

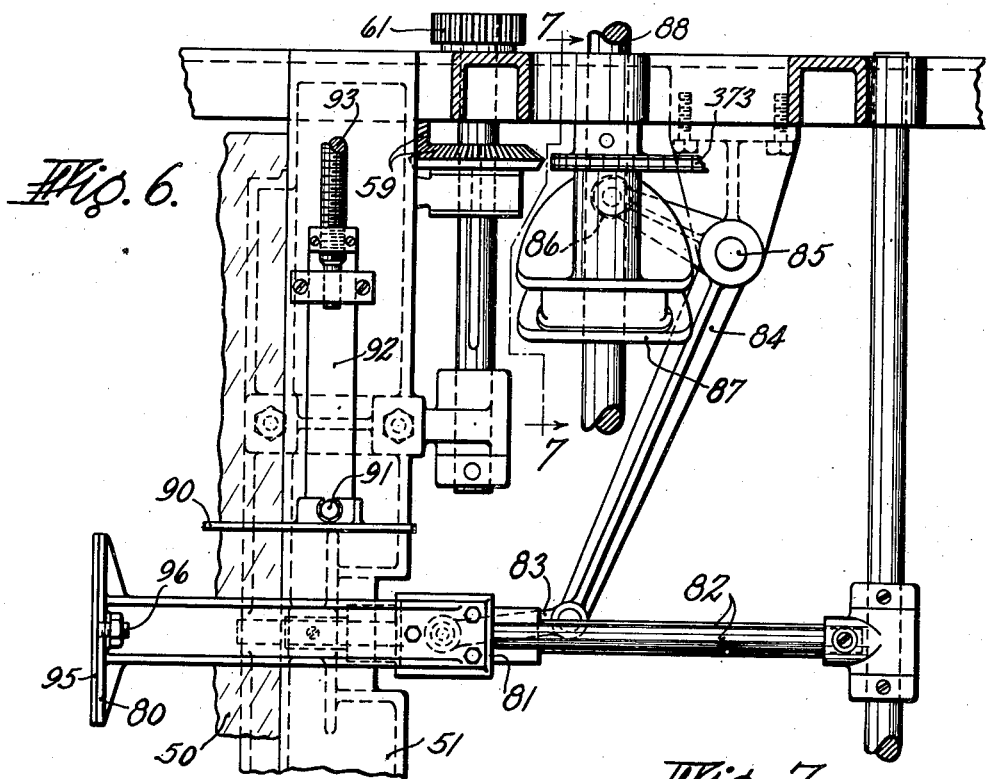
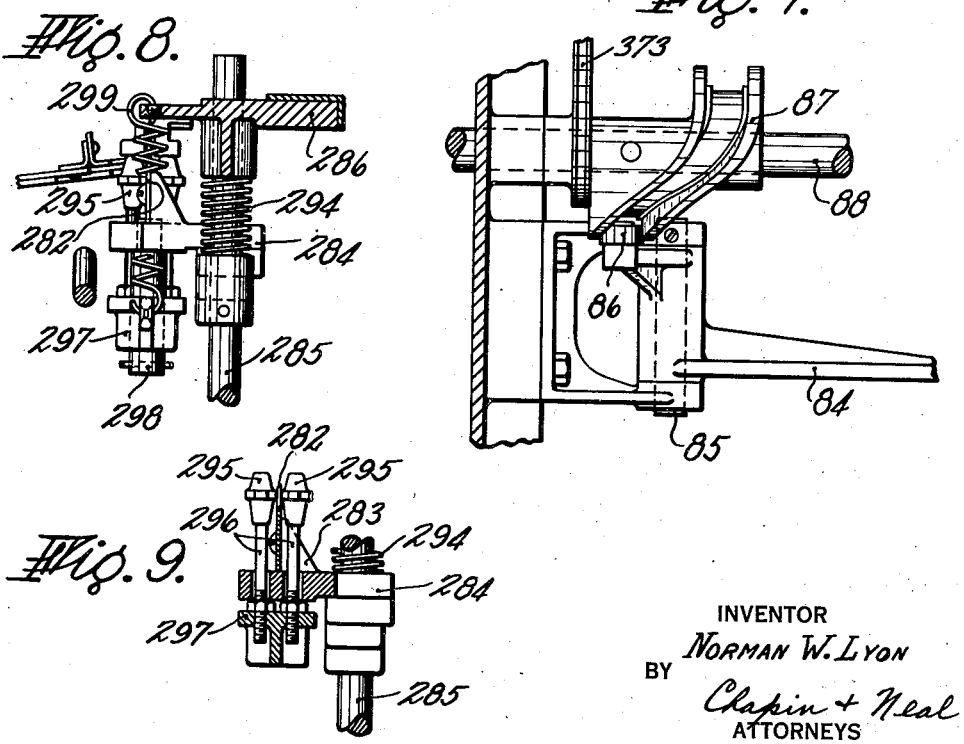

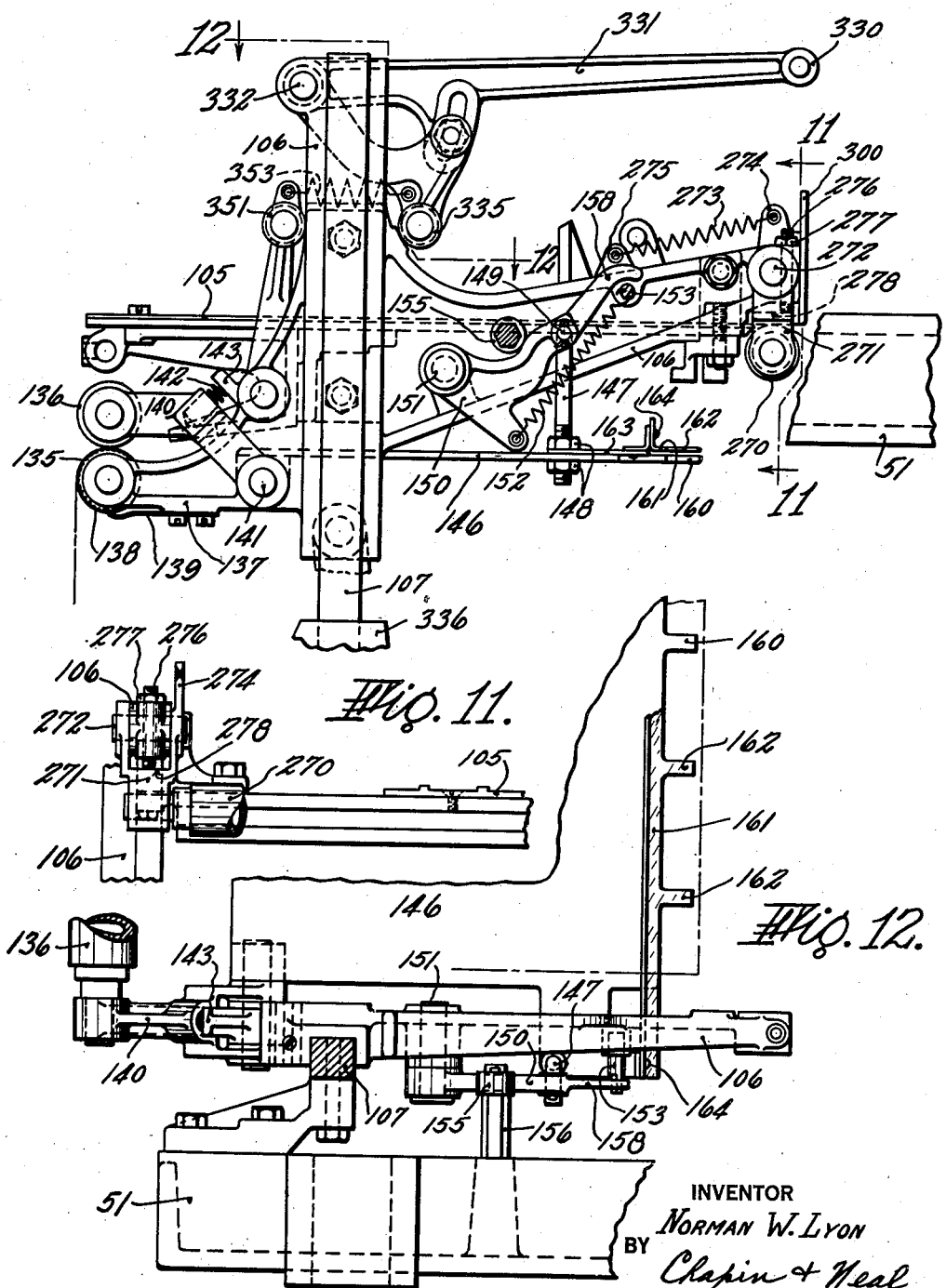

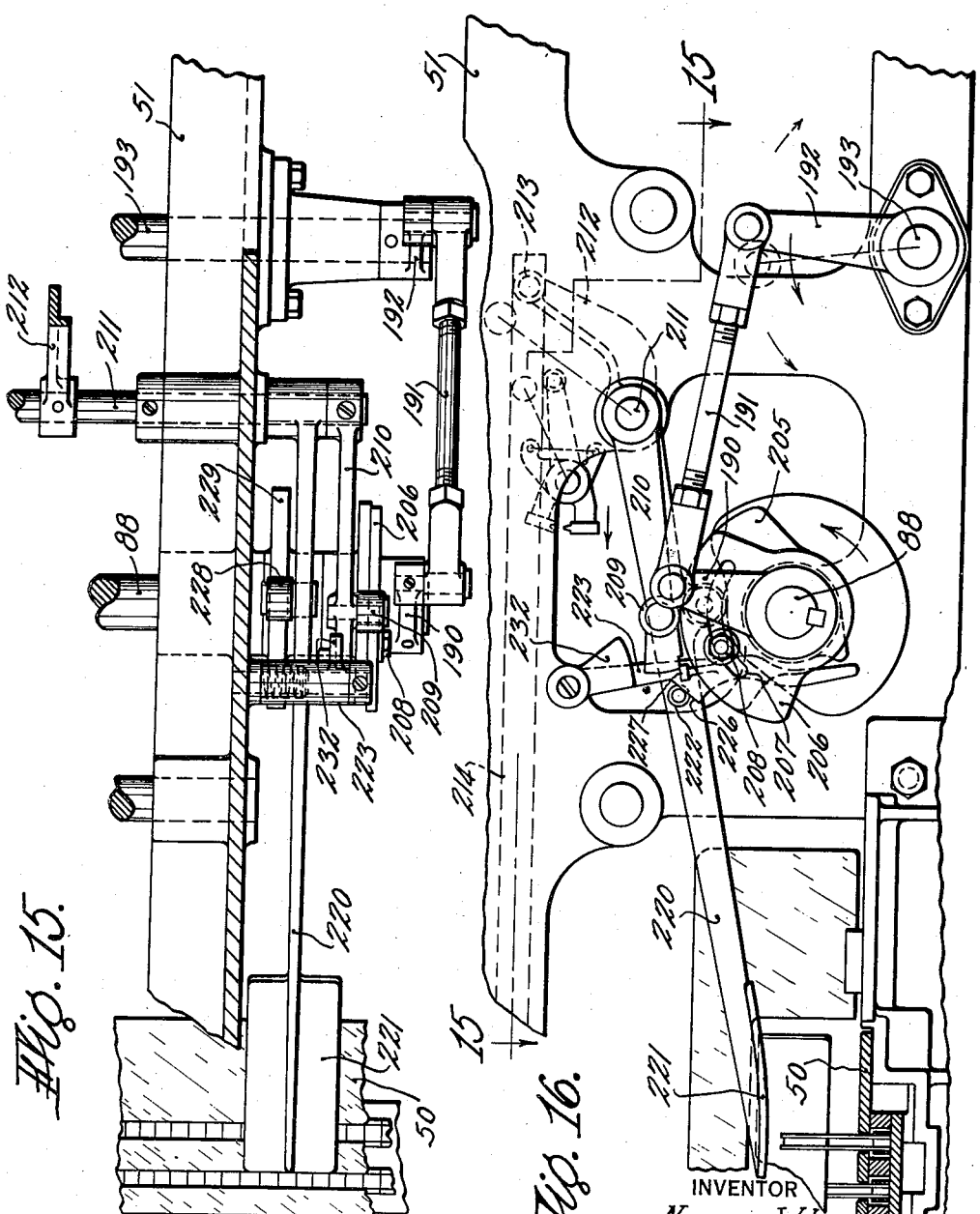

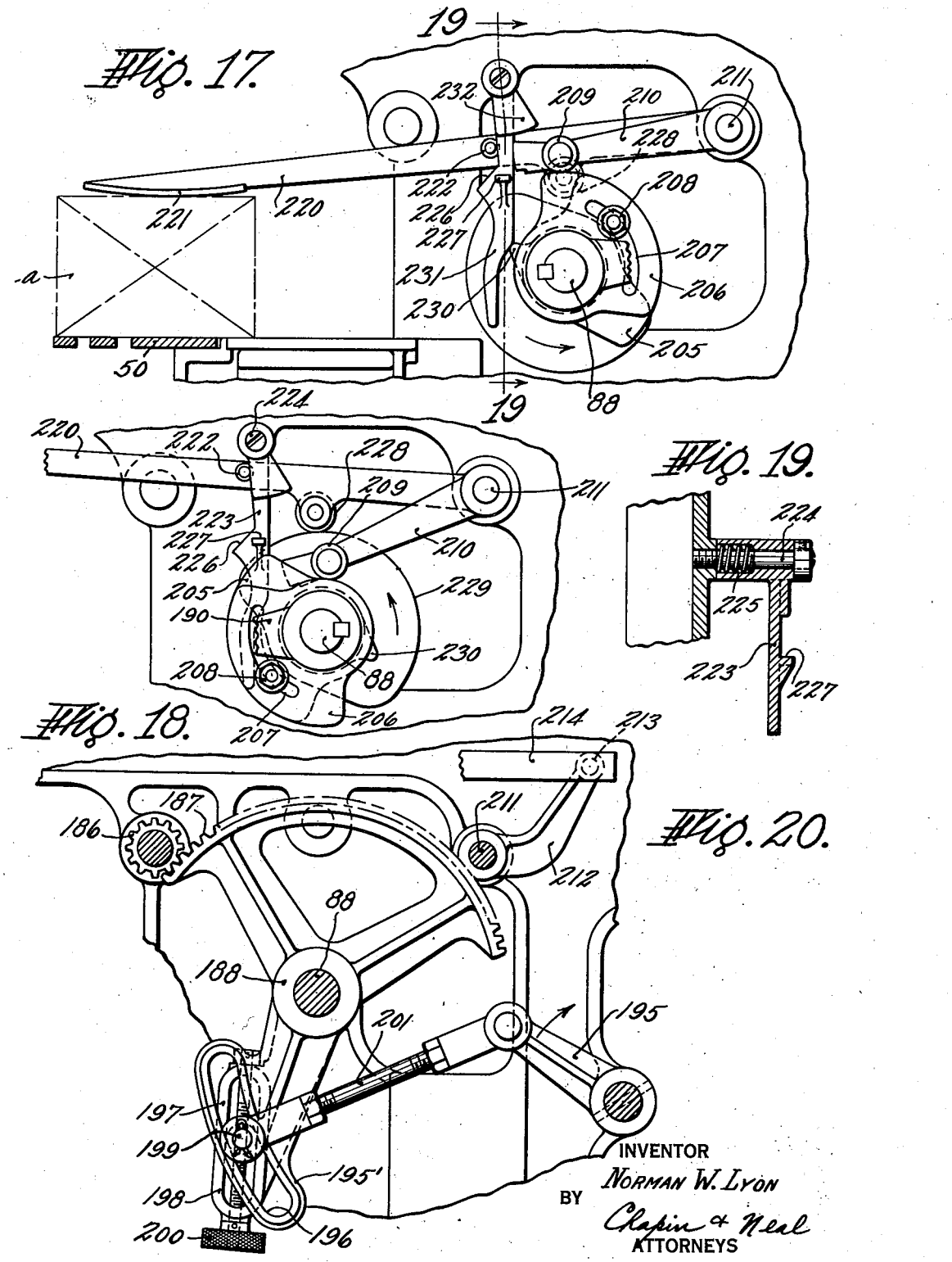

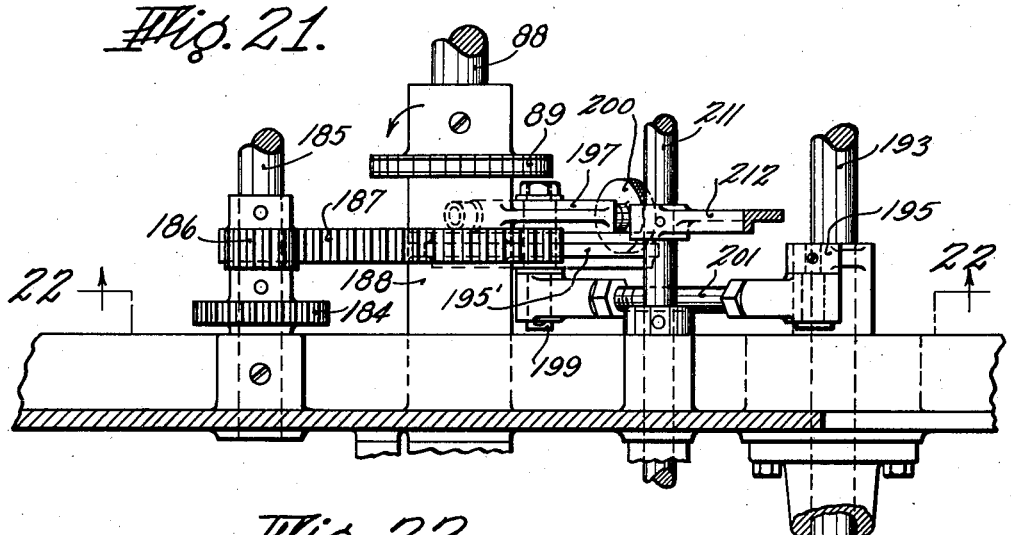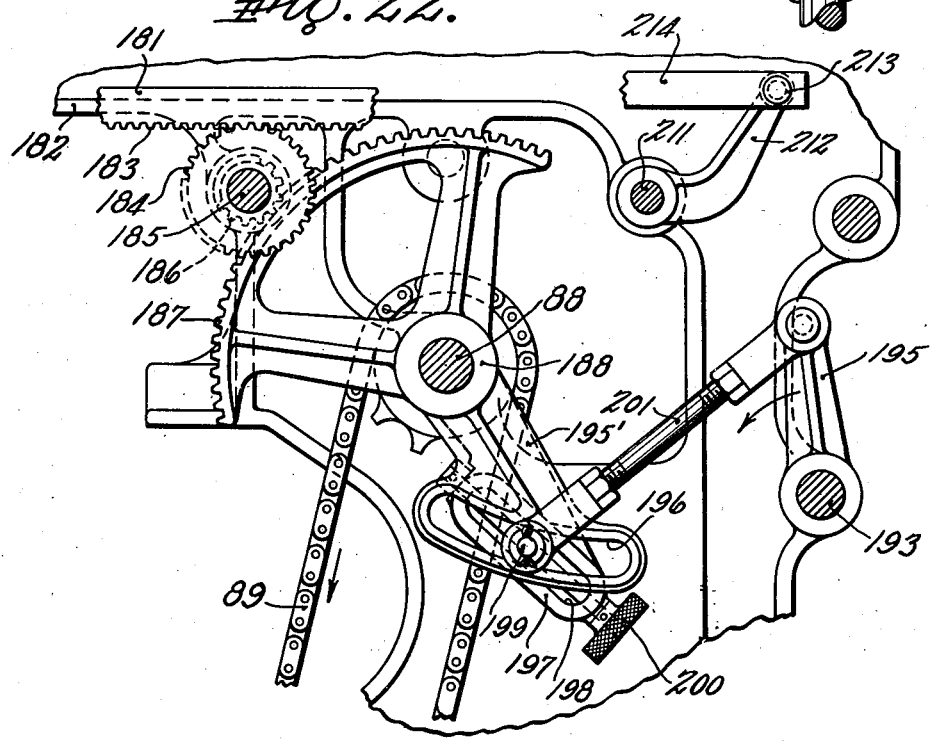

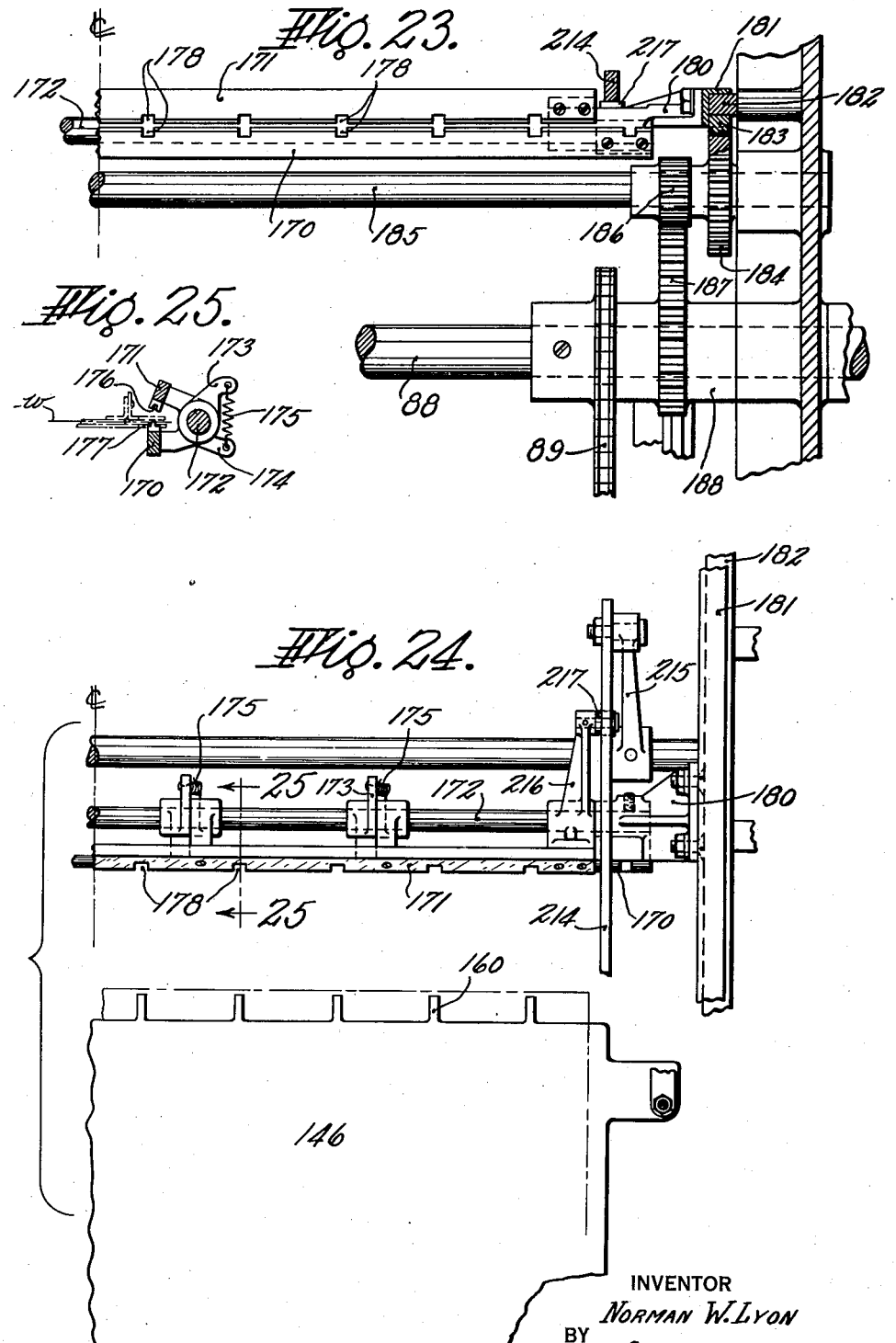

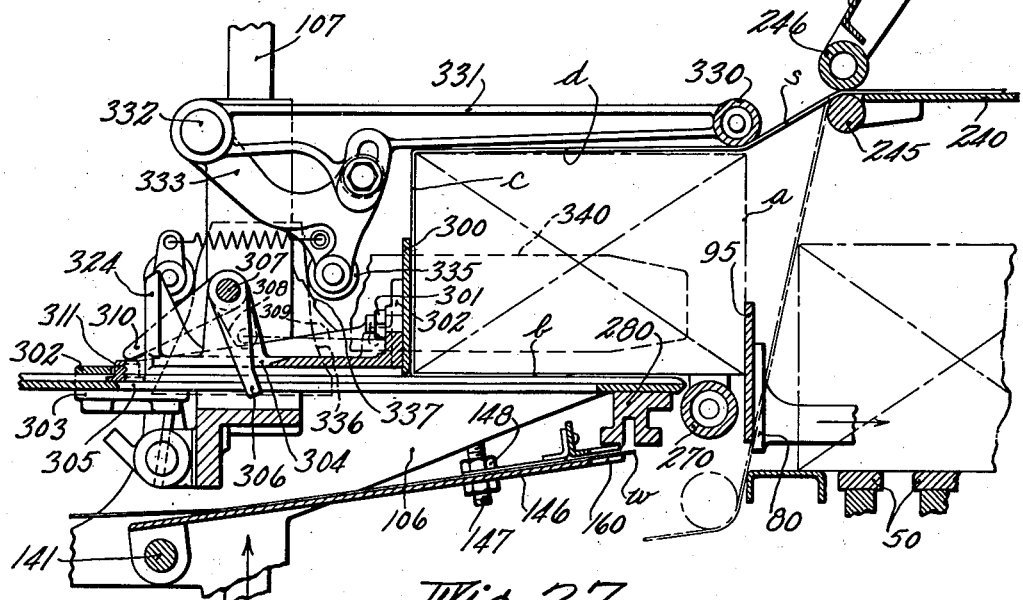
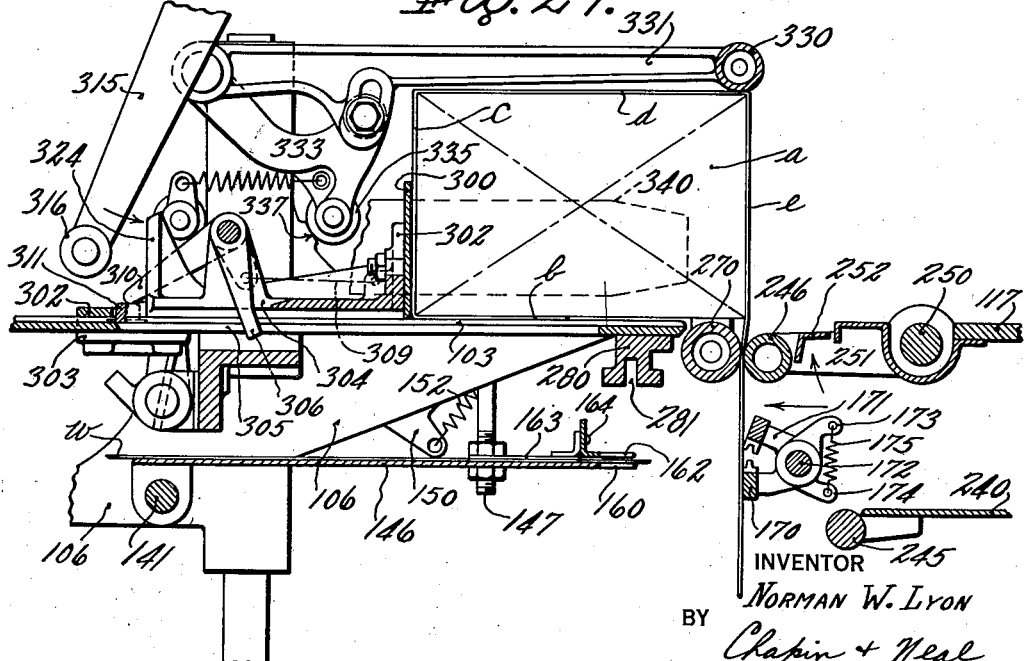

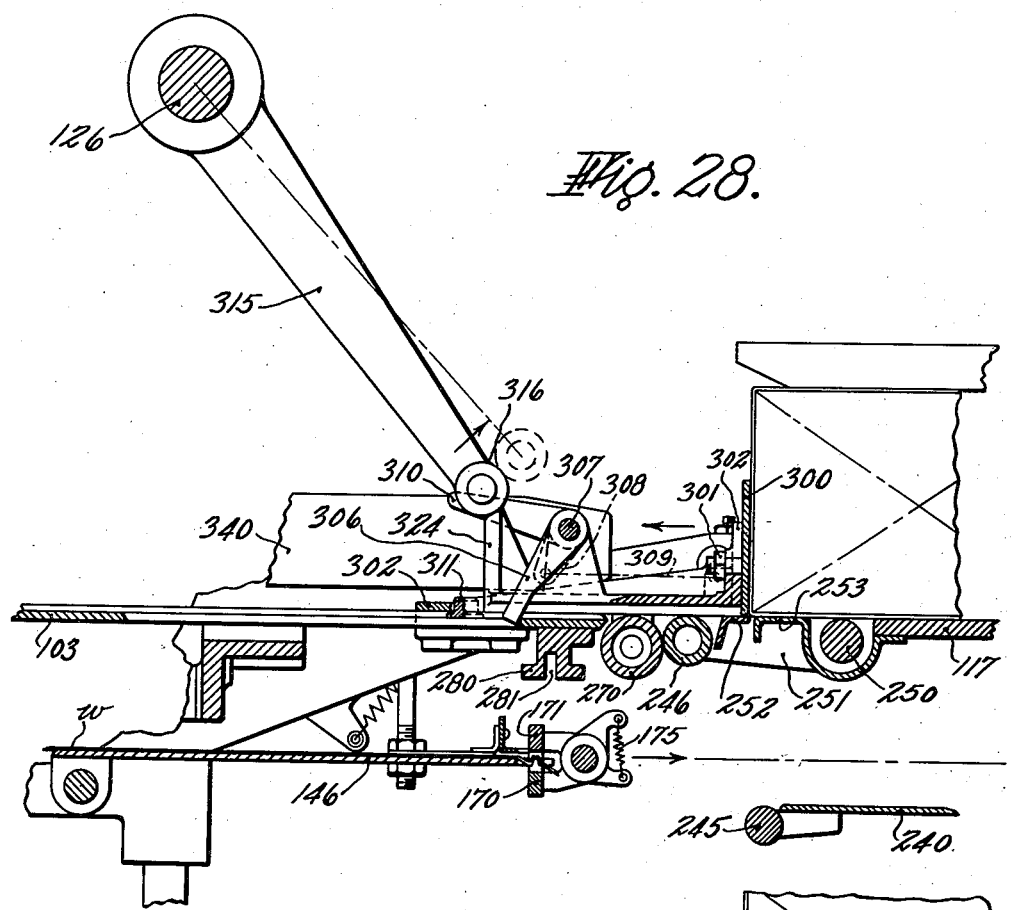
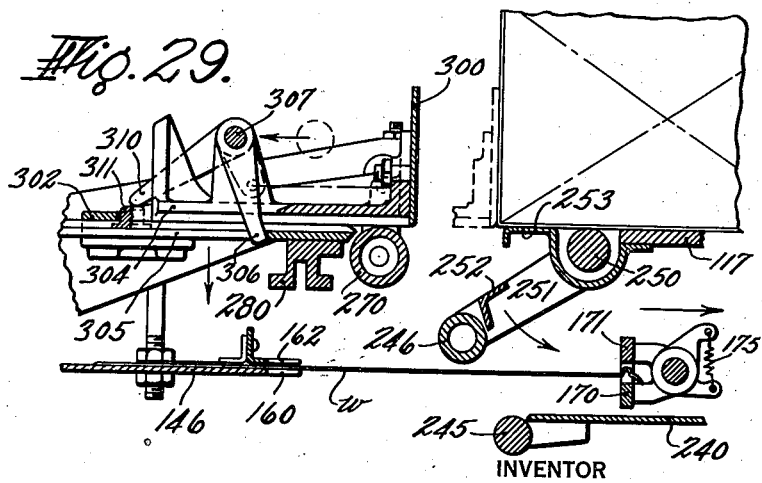

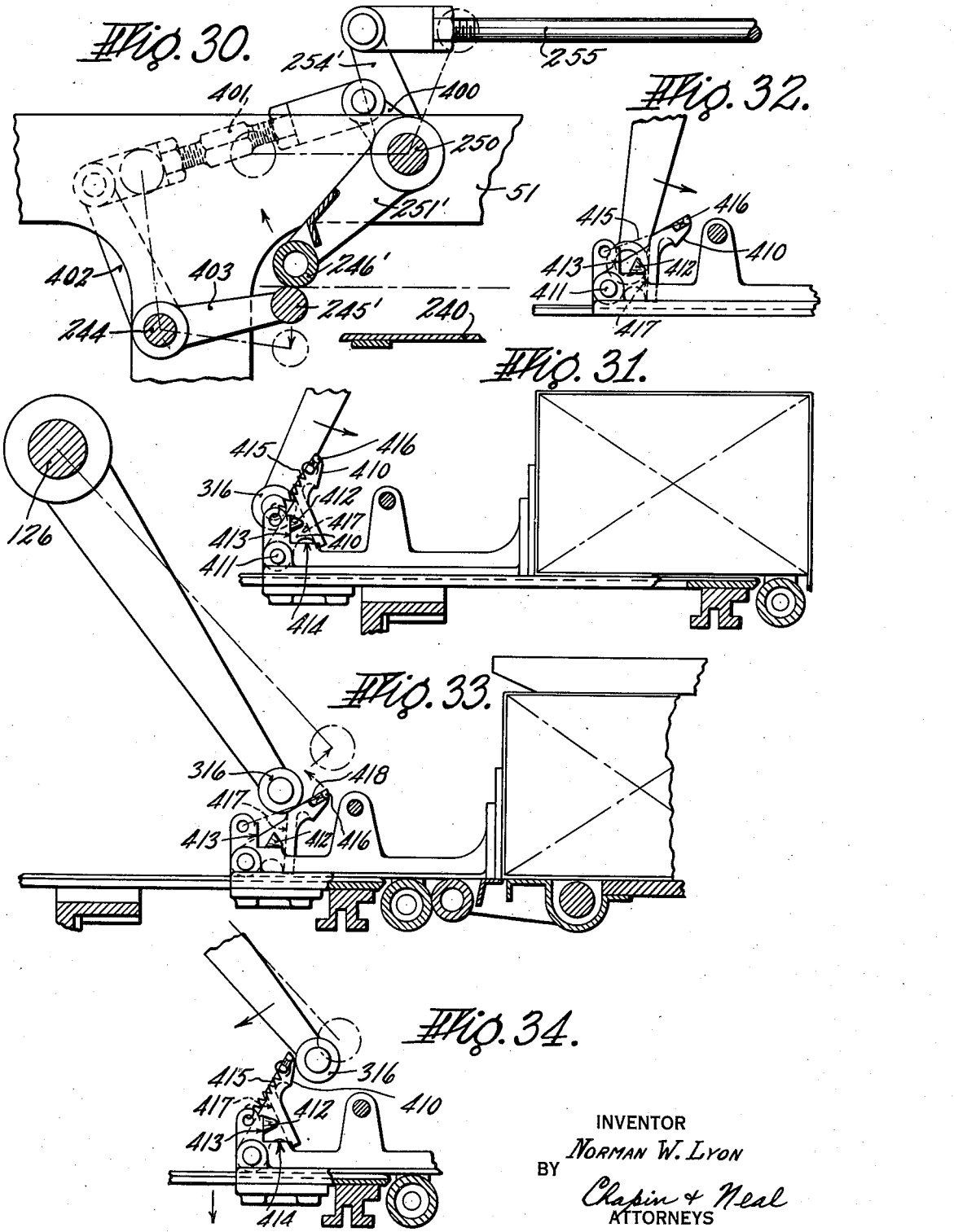

Patented June 1, 1937

2,082,408

UNITED STATES PATENT OFFICE 2,082,408

BREAD WRAPPING MACHINE

Norman W. Lyon, Springfield, Mass., assignor to National Bread Wrapping Machine Co., Springfield, Mass., a corporation of Massachusetts Application March 12, 1934, Serial No. 715,070

13 Claims. (Cl. 93—2)

This invention relates to improvements in wrapping machines, particularly such as are adapted for wrapping optionally such varying articles as cartons and loaves of bread. One object of the invention is to improve upon machines of this general type with particular reference to the ease and range of their adjustability. A further object is to improve the manner of feeding a web of wrapping material to the machine and for cutting it off at the proper intervals. A further object is to provide an improved mechanism for adjusting the length of wrapper cut off at each cycle. A further object is to improve the manner of conveying the partially wrapped article through the machine. A further object is to improve wrapping machines of the type in which an article and wrapper are pushed laterally onto a vertically reciprocating elevator or carrier at one station and laterally off from the carrier at another station; particularly as to the mechanism by which certain folds are made on said elevator and the mechanism by which the article is pushed off from the elevator. Additional objects will appear from the following description and claims.

The invention will now be described with reference to the accompanying drawings, in which, Fig. 1 is a central section through a machine embodying my invention;

Fig. 2 is a rear elevation thereof;

Fig. 3 is a section, in plan and on an enlarged scale, taken on line 3—3 of Fig. 1;

Fig. 4 is an elevation, looking from the left in Fig. 1, of the article elevator;

Fig. 5 is a section on line 5—5 of Fig. 3, with certain parts removed for clearness;

Fig. 6 is a detail plan of certain article forwarding mechanism.

Fig. 7 is a section on line 7—7 of Fig. 6;

Fig. 8 is a section on line 8—8 of Fig. 5;

Fig. 9 is a detail of the web cutting mechanism in its lowered position;

Fig. 10 is a side view of the article elevator in its most elevated position;

Fig. 11 is a detail on line 11—11 of Fig. 10;

Fig. 12 is a fragmentary top plan view of the mechanism shown in Fig. 10, with some parts in section on line 12—12 of that figure;

Fig. 15 is a detail plan of the wrapper feed control mechanism, the section being taken on line 15—15 of Fig. 16;

Fig. 16 is a side elevation of the mechanism shown in Fig. 15, showing the position of the parts when no article is present on the feeding-in conveyor;

Fig. 17 is a detail similar to a portion of Fig. 16, showing the resetting position of the control latch;

Fig. 18 is a similar view showing a later point in the cycle;

Fig. 19 is a section on line 19—19 of Fig. 17;

Fig. 20 is a detail of the adjustment for the gripper operating device, with the gripper at the forward end of its stroke;

Fig. 21 is a plan view of the gripper operating mechanism with the gripper in the position of Figs. 15 and 16;

Fig. 22 is a section on line 22—22 of Fig. 21;

Fig. 23 is a front end view of the gripper jaws;

Fig. 24 is a top plan of the grippers and the adjacent paper supports on the article elevator;

Fig. 25 is a detail section on line 25—25 of Fig. 24;

Figs. 26, 27, 28 and 29 are detail views showing successive stages in the transit of an article through the machine;

Fig. 30 is a detail of a modification; and

Figure 13:
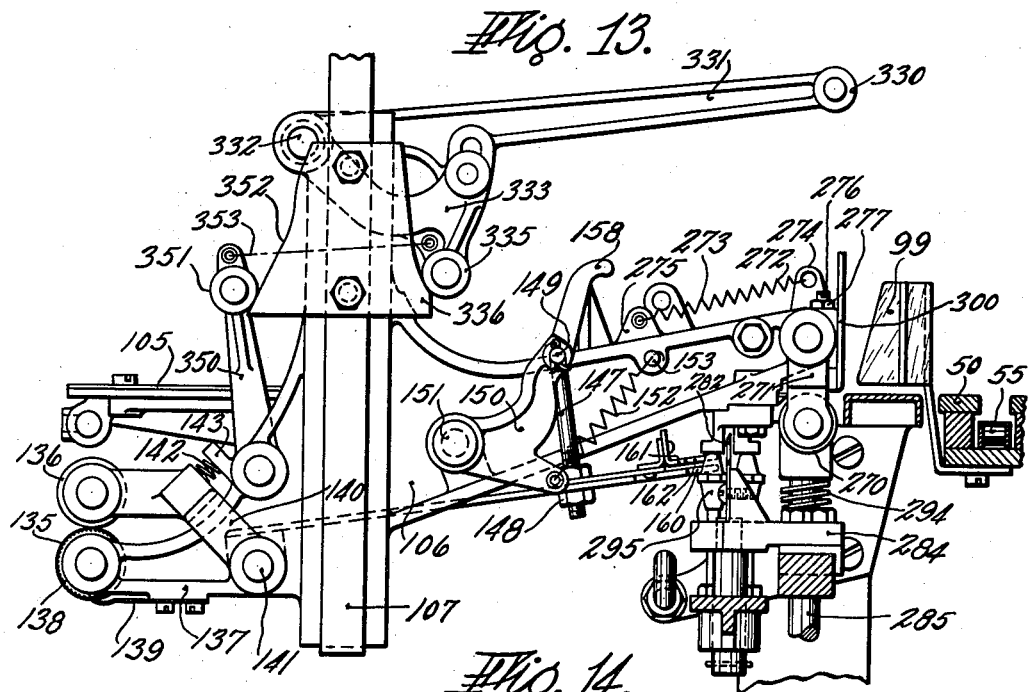
Fig. 13 is a detail of the elevator mechanism generally similar to Fig. 10 but showing the elevator in its lowermost position, certain parts being shown in section on line 13—13 of Fig. 5.

Figs. 31, 32, 33, and 34 are details of another modification.

The articles, such as loaves of bread or cartons, which are to be wrapped by the machine are placed upon a supply shelf 50 either by hand or by an inclined supply chute. The outer end of shelf 50 has been broken off in the drawings since the particular manner of supplying the articles is not material in this invention. Its inner end is carried by the frame 51 of the wrapping machine. Paddles 52 and 53 (Fig. 3) arising from parallel chain conveyors 54 and 55 through slots 56 in the shelf, engage the rear and front ends of the article respectively. This construction, which is of particular utility when sliced bread is being wrapped, is fully described in the Littlefield Patent 1,843,453, February 2, 1932, and in the patent to Smith and Hoppe 1,953,195, April 3, 1934, and need not be described in detail.

The chains are carried at their outer ends by sprockets, not shown in the present case, and at their inner ends by sprockets 57 and 58 (Fig. 2) adjustably secured as in the Smith and Hoppe patent to a short shaft having bevel gear connection 59 with a stub shaft 60. A pinion 61 on the latter shaft meshes with a gear 62 secured to the driven part 63 of a Geneva drive. The driving part 64 of this drive is coupled by gearing 65 to a shaft 66 extending across the machine, where it is coupled by gearing 67, 68 (Fig. 1) to a driven pulley 69. A belt 70 joins this pulley to a driving pulley 71 on the shaft of a motor 72. In order to secure a speed adjustment, one of the pulleys 69 or 71 is split into two halves spring pressed together, and the motor is mounted on a sliding base adjustable by means of a hand screw 74. The pulleys being provided with conical belt engaging surfaces, this shifting of the motor base will cause a spreading or contraction of the spring held halves of the adjustable pulley, and will therefore change the effective diameter of the pulley. By the mechanism described above the conveyor paddles will be advanced intermittently along the shelf 50, and will be brought to rest in the position of Fig. 3.

In this position of the conveyor paddles the article $a$ is left in front of a pusher 80 (Figs. 3 and 6) by which it is moved laterally off the shelf 50 into the wrapping mechanism. The body of the pusher is secured to a slide 81 (see also Fig. 1) mounted for reciprocation upon parallel guide rods 82. A link 83 connects the slide 81 with one arm of a bell crank 84 pivoted at 85 to the frame and carrying on its other arm a cam roll 86 (Fig. 7) running in the track of a barrel cam 87. This cam is fixed to a shaft 88 extending across the machine and driven by a chain and sprocket connection 89 from the shaft 66 previously described. The pusher is reciprocated during each cycle from its rear position of Fig. 1 to its forward position of Figs. 6 and 26.

It is preferable to guide the article as it is being pushed from the feeding shelf, and especially in case sliced bread is being wrapped to have the pusher engage the article throughout its length. As a guide a back plate 90 (Figs. 3 and 6) is employed, being cut away as indicated in Fig. 2 to clear the paddles 52, 53. This plate is removably secured by a bolt 91 to a slide 92 suitably mounted in the machine for movement longitudinally of the shelf, and is adjustable by a screw 93 extending outside the frame and operable by a handwheel which has been omitted from the drawings in order to expose certain parts behind it. The pusher 80 is provided with a removable front plate 95 bolted to it at 96, so that the effective width of the pusher can be changed to correspond to various widths of article. The articles are guided during their conveyance by the paddles 52, 53 by side guides 97 and 98, and during their conveyance by pusher 80 by the back plate 90 and a guide 99.

The articles are moved by the pusher 80 onto an elevator which carries an article supporting platform, a backing plunger serving to hold the article and wrapper tightly assembled during their movement onto the elevator, certain folding mechanism, and a portion of the wrapper feeding devices. These various mechanisms are of novel character and will be described in detail below. The article supporting platform, built up of three plates 102, 103 and 104 (Fig. 3) and generically referred to as 105, is preferably ribbed as shown in Figs. 3 and 5 in order to minimize friction and to assist in securing straight travel of the article and wrapper. It is carried upon an elevator frame 106 (Figs. 1, 3 and 10) fitted for vertical reciprocation upon guide rails 107. A link 108 (Fig. 1) is pivoted to the elevator frame and to an arm 109 fixed upon a shaft 110. Also fixed to this shaft is a second arm 111 (Fig. 2) slotted at 112 to receive a block 113 carried by one end of a double armed rocker 114. The second end of the rocker is joined by a link 115 to a crank 116 fixed upon the shaft 66. As this latter shaft rotates continuously the elevator will be moved up and down from a position in alignment with the shelf 50 to a position in alignment with a delivery table 117. The linkage described has the advantage of giving a practically stationary dwell at both ends of the reciprocation, so that ample time to get the article onto and off the elevator is obtained.

As the article is being carried onto the elevator plate by the pusher 80 it contacts with a sheet $s$ (Fig. 26) of wrapping material draped in a generally vertical position across the open side of the elevator. This sheet is cut from a web $w$ supplied on a spool 120 (Fig. 1) journaled on a bracket 121. In the present machine the spool is located at the end of the machine remote from the delivery end, and is in an accessible position not conflicting with the feeding of articles to the machine or the removal of articles from it. A second spool 120' supplies an additional web $w'$ in case a double wrap is desired, or may be used to facilitate a rapid change from an exhausted spool to a fresh one. The two webs are generally handled as a unit, and will be considered as a unit in the following description. The web passes over a guide roll 122 around a snubbing roll 123, and then over a floating roll 124 carried in arms 125 pivoted to the machine frame at 126. A spring 127 is stretched between a lug on each arm 125 and a cross rod 128 on the frame so that as viewed in Fig. 1 the arms are given a constant tendency to rotate in a clockwise direction so as to draw upwardly a loop of wrapping material between the snubbing roll 123 and a pair of stationary guide rolls 129 and 129' for the webs $w$ and $w'$. As long as the loop is taut it will be drawn tightly around the snubbing roll 123, which is continuously rotated by a sprocket and chain connection 130 from the shaft 66. The surface of the snubbing roll is covered with a frictional material, so that additional material will be unwound from the spools as long as the floating roll 124 is keeping the loop taut. As soon as the floating roll reaches the limit of its motion the unwinding action of the snubbing roll automatically ceases.

After leaving the roll 129 the web $w$ passes between a pair of rolls 135 and 136 (Figs. 1, 4 and 10) mounted upon the elevator frame 106. The lower of these two rolls is mounted directly in an extension 137 of the elevator frame, and carries a ratchet 138 prevented from rearward rotation by a spring pawl 139. The upper roll 136 is journaled in two arms 140 swinging upon pivots 141. Each arm is formed with a socket receiving a compression spring 142, the other end of which bears against an abutment 143, so that the two rolls are held yieldingly together at all times. It will be apparent that while paper may be pulled freely through the rolls towards the article receiving side of the elevator it cannot be drawn backwardly on account of the pinching action of the rolls and the holding action of the ratchet 138. The web then passes under the main elevator plate 105 and over a web supporting plate 146 pivoted to the elevator frame at 147.

Figure 14:
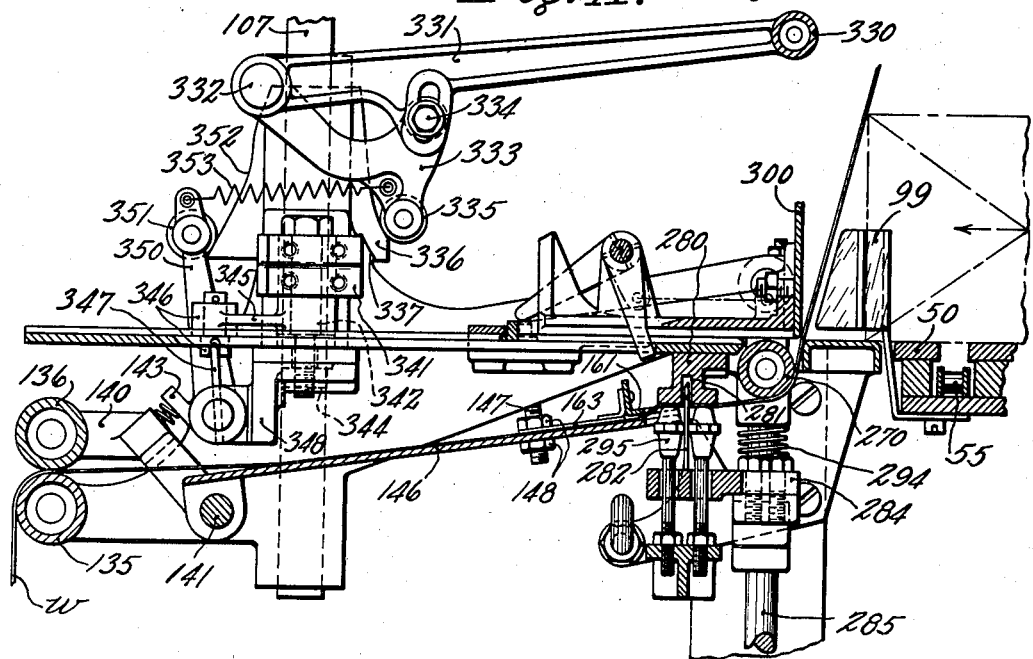
Fig. 14 is a section of the elevator in its lowermost position, the section being taken on line 14—14 of Figs. 3 and 5.

This plate is adapted to be swung from its normal position of Fig. 14 to a position parallel to the main elevator plate whenever the elevator reaches its uppermost position, in order to present the leading edge of the web to the reciprocating grippers as will be described below. In order to tilt the plate a stud 147 is secured to each end of it as by nuts 148. At its upper end each stud is bent over at 149 to pass through, and to form a pinned connection with, an arm 150 pivoted to the elevator frame 106 at 151. A spring 152 is stretched between a lug on the arm and a pin 153 on the elevator frame, so that unless the arms 150 are positively moved the plate 146 will be held in its upper position. When the elevator nears the upper limit of its stroke the arms 150 strike stationary rolls 155 (Figs. 1 and 10) supported on brackets 156 (Fig. 12) projecting inwardly from the main machine frame 51. Each arm is preferably provided with a tail 158 so that if its supporting spring should break the tail will engage the pin 153 and prevent the plate dropping sufficiently to cause damage to the machine.

The free end of the plate 146 is provided with spaced projecting fingers 160 best shown in Figs. 12 and 24. A relatively narrow paper retainer 161 (Fig. 10) is located above this end of the plate, having fingers 162 corresponding to those on the plate. The paper retainer is held to springs 163 as by a rivet connection 164, the springs being conveniently secured to the plate 146 by the nuts 148 which hold the studs 147. The spring support of the paper retainer is not so much to exert any tension on the paper as to permit the retainer to be lifted manually in order to facilitate the threading in of a fresh web of wrapping material. The projecting fingers 160 and 162 act, as will be more clearly apparent when the reciprocating grippers have been described, to hold the forward edge of the web in position for engagement by the gripper jaws.

The feeding of the web beyond the fingers 160, 162 can most conveniently be considered when the elevator is in its upper position as shown in Fig. 27. In that position the web supporting plate 146 is down, and the end of the web (having previously been cut by means to be described below) projects slightly beyond the fingers 160, 162. It is thus held for seizure by a reciprocating gripper comprising a stationary lower jaw 170 and a movable upper jaw 171 fixed and pivoted respectively to a cross shaft 172. Lugs 173 and 174 on the upper and lower jaws are connected by springs 175 (Figs. 24 and 25) to draw the jaws tightly together when permitted by the gripper operating mechanism. One of the jaws is formed with a groove 176 and the other with a tongue mating with it, so that the web will be corrugated as shown in Figs. 28 and 29, and the tightness of the grip markedly improved. Both of the jaws are notched at 178 (Fig. 24) to correspond with the fingers 160 and 162. Irrespective of any crumpling or wrinkling of the exposed end of the web, the portions between the fingers 160 and 162 will always be relatively straight. As is clearly shown in Fig. 28, the grippers enter well beyond the ends of the fingers and can close upon the web in that position, the notches 178 being wide enough to give ample clearance. A much more uniform action of the grippers is obtained by this means than with prior devices.

Each end of the gripper supporting shaft 172 is fixed in a carriage 180 (Figs. 23 and 24) attached to a slide 181 running longitudinally of the machine on guideways 182. Each carriage bears a rack 183 (Figs. 22 and 23) meshing with a pinion 184 (see also Fig. 21) on a cross shaft 185. A pinion 186 fixed on this shaft meshes with a segment gear 187 whose hub 188 is loose upon the shaft 88 previously referred to. This segment gear is oscillated to cause reciprocation of the grippers by mechanism adjustable to vary their travel without changing their end position of Fig. 28 where they pick up the web. Change in the length of web drawn out at each cycle is secured by changing the rear end point of travel. To drive the grippers a crank 190 (Figs. 15 and 16) is fixed to the constantly rotating shaft 88, and drives through a link 191 a crank 192 on a cross shaft 193. A second crank 195 (Figs. 20, 21, and 22) is fixed to the shaft 193 at a point inside the machine frame. On the segment gear 187, which it will be recalled is free to oscillate on the constantly driven shaft 88, is an arm 195' having an eccentric arcuate slot 196 formed in it. Also free upon the shaft 88 is a second arm 197 having a straight slot 198 inclined at an angle to the slot 196. A pin 199 extends through both slots and may be moved back and forth in the slot 198 by an adjusting screw 200. A link 201 connects the pin 199 with the crank 195. The slot 196 is concentric with the crank pin of crank 195 when the parts are in the position of Fig. 20, in which the gripper is in its initial web grasping position. A change in the position of pin 199 obtained through the adjusting screw 200 will change the radial position of the pin 199 relative to the shaft 88 but due to the engagement of the pin with the arcuate slot 196 the pin will be constrained to rotate about the crank pin as a radius and no change in the position of the gripper operating segment gear 187 will result. It will be observed that the described relation between the arcuate slot and the crank pin does not hold for any position of the parts other than the initial web-grasping position of Fig. 20, as will be clear from Fig. 22. In the latter position the change in radial position of the pin 199 is combined with its motion along the slot 196 to change the angular position of the segmental gear. The extent of travel of the gripper can thus be varied easily without changing its extreme forward stopping point.

The opening and closing of the gripper is controlled by an adjustable cam, cooperating in a manner to be described with the crank adjustment just considered. On the shaft 88 is fixed a cam 205 (Figs. 16, 17, and 18). Beside it, but free on the shaft, is a second cam 206 having an arcuate slot 207 through which passes a clamping stud 208 on the first cam. The two cams have their outer surfaces concentric, so that they form in effect a single cam of adjustable length. Resting on the surface of this composite cam is a roll 209 carried by an arm 210 fast on a cross shaft 211. That shaft also carries an arm 212 (Figs. 1, 15, 16, 20 and 22) pivoted at 213 to a bar 214 extending lengthwise along the line of travel of the gripper and supported at its other end by an arm 215 (Figs. 1 and 24) pivoted to the frame. The arms 212 and 215 form a parallel motion support for the bar. An arm 216 (Fig. 24) is secured to the movable element 171 of the gripper and carries a roll 217 held by springs 175 in constant contact with the under side of the bar 214 (Fig. 1).

As the roll 209 rides off the end of cam 205 the bar 214 will be elevated and the gripper will be closed. This occurs at the extreme forward end of the travel of the gripper, a position which is fixed irrespective of the length of stroke imparted to the gripper. The point in the cycle at which the gripper will be opened is determined by the point when the bar 214 is lowered by the roll 209 riding up on the adjustable cam 206. This adjustment is used in connection with the adjustment 200 which controls the length of stroke given to the grippers, being set so as to open the gripper just prior to the termination of the gripper's movement. The adjustment 200 thus forms a very accurate means of regulating the length of sheet drawn out, the adjustment 208 being changed to follow it, and also being used as a coarser adjustment where sheets shorter than those delivered by the shortest possible travel of the gripper are to be drawn out.

It is desirable to make provision for omitting the feeding of the web in case no article is presented for wrapping. In the present case this is done by preventing the closing of the gripper, allowing it to reciprocate back and forth as usual. An arm 220 (Figs. 15 to 18) is pivoted freely on the shaft 211, and bears at its end a shoe 221 adapted to rest upon articles being fed to the machine by the conveyor pushers 52. The arm also bears a roll 222 adapted to engage the side of a latch 223 pivoted to the frame at 224 and held against too free turning by a friction spring 225 (Fig. 19). A cam surface 226 is formed on the latch in position to be engaged by the roll 222 when the arm 220 is lowered as in Fig. 16, and a ledge 227 is formed upon it in line to engage the end of the gripper operating cam lever 210.

The arm 220 is arranged to be raised and lowered periodically by a roll 228 riding on a cam 229 on shaft 88. The lowering of the arm is timed to occur at a time when an article $a$ has been brought to rest by the feeding-in conveyor at the stopping position just prior to the one in which the article is in front of the pusher 80. If an article is in position on the conveyor the arm 220 will not descend below the position of Fig. 17. If, however, an article is absent as in Fig. 16 the arm will descend until the roll 222 strikes the cam surface 226, causing the latch 223 to be swung until its ledge 227 underlies the end of lever 210, which at that time is held elevated by the cam 205, 206. The gripper is at this time near the rear of its stroke, having released the drawn out web, and is about to move forwardly to receive the freshly cut web end. It is normally held open during this forward stroke by the cam 205, 206, and would close at the forward end of the stroke by the passage of the roll 209 off the end of cam 205. This action is not permitted in the case under consideration because of the inter-position of ledge 227 underneath the arm 210. The arm 220 has meanwhile been elevated by its cam 229, but the friction spring 225 prevents the latch moving back until it is positively shifted. The latch will hold the gripper open during its rearward travel, and no wrapper will be drawn out.

When the gripper reaches about the point in its cycle at which it would normally be opened by the cam 206 the latch is pushed over into the position shown in Fig. 17 by a cam 230 striking against the tail 231 of the latch. At about the same period the arm 220 is again permitted to descend by its cam. If now an article is in place on the conveyor as in Fig. 17 the arm 220 will be held elevated, and the ledge 227 will remain out of the path of the end of arm 210. Opening and closing of the gripper will take place under these conditions in accordance with the cam 205, 206 without interference by the latch. As a safety measure the latch carriers a member 232 which limits the upward throw of arm 210, preventing it from being thrown upwardly by its cam when the machine is operated at high speeds.

As is best shown in Fig. 28, the gripper reaches its forward position and seizes the end of the web $w$ at a time when the elevator is raised to a level with the delivery plate 117 and the paper holding plate 146 is turned to a horizontal position. The gripper closes upon the portion of the web extending between the fingers 160 and 162, the notches 178 permitting it to clear the fingers, and due to the shape of the gripper jaws bends the web into a sharp U-shape. A very firm grip is thereby maintained. The gripper moves away so as to clear the elevator before the latter descends, drawing out the web between the bottom of the delivery plate 117 and a web supporting plate 240. This plate is carried on arms 241 (Figs. 1 and 2) pivoted at 242 to the machine frame. These arms have a lose connection with a rod 243, and are permitted a slight adjustment by a set screw 244. The arms also carry a roll 245 extending across the web at the edge of the plate 240. This roll cooperates with a rubber surfaced roll 246 to guide the web and the cut sheet as will be descrobed.

Mounted on a cross shaft 250 (Fig. 2) are arms 251 spaced at opposite sides of the machine. These arms carry the roll 246 before mentioned, and are connected by a web 252 (Fig. 28) which when the arms are elevated are aligned with a plate 253 forming an extension of the delivery plate 117. An arm 254 (Fig. 2) is also connected to the shaft 250, and is joined by a link 255 with a rocker 256 pivoted to the frame at 257. This rocker bears a roll 258 held against a cam 259 on the shaft 88 by a spring 260. A second cam 261 is held to the side of cam 259 by a stud 262 passing through a slot 263 in cam 261 and into threaded holes 264 in the cam 259. The roll 258 is broad enough to straddle both cams, the narrower cam 261 acting as an adjustable projection of the larger one. The main part of the cam acts to swing the roll 246 from its elevated position of Fig. 28 to its lowered position in contact with roll 245 as shown in Fig. 26. The shorter cam 261 serves to give a temporary squeezing pressure between the rubber surfaced rolls 245 and 246 and to prevent movement of the web between them during that period. It may be used to prevent the web being drawn backward by any residual downward movement of the elevator left after the grippers have opened; or may be adjusted to apply a short tension to the trailing end of the web as the article and wrapper are fed together into the elevator, and thus to tighten the wrapper around the article. The rolls 245 and 246 coact to maintain the lateral alignment of the web as it is being drawn between them.

In its upper position the roll 246 contacts with a roll 270 (Figs. 10 and 11) carried on yokes 271 pivoted at 272 to the front end of the elevator frame 106. A spring 273 is stretched between a lug 274 on each yoke and a lug 275 on the elevator frame so that the roll 270 is constantly urged in the direction of the roll 246. This motion is limited by a set screw 276, adjustably held by a nut 277, which contacts with an abutment 278 on each yoke. By varying the adjustment of the set screws the pressure between the rolls 270 and 246 can be varied. As will be apparent from Figs. 27 and 28, these rolls grasp the trailing end of the wrapper flap between them as the partially wrapped article is pushed off the elevator, giving a tension to the wrapper which can be regulated by set screws 276.

Fig. 29 shows the elevator about to begin its descent, with the gripper drawing the web away from the elevator and the roll 246 on its way towards web guiding contact with the roll 245. As the elevator moves down the web supporting plate 146 will be swung upwardly to the slanting position shown in Fig. 14, and the web brought into adjacency to the roll 270 and to a cutting block 280 carried by the elevator and having a cutting groove 281. When the elevator reaches its lowermost position the web is severed by a movable knife 282, preferably slanting from one side of the web to the other so as to give a shearing cut. This knife is mounted on brackets 283 (Fig. 9) extending from a carrier 284 secured to rods 285 vertically slidable in brackets 286 (Figs. 3, 5 and 8) attached to the sides of the frame. Pivoted to the rods 285 are arms 287 (Fig. 1) fixed on a shaft 288. An arm 289 also fixed on this shaft carries a roll 290 running on the surface of a cam 291 having an adjustable roll operating portion 292 secured to the main body of the cam as by a stud and slot connection 293. The timing of the cutter relative to the elevator may thus be controlled. A spring 294 (Fig. 8) is compressed between each bracket 286 and the carrier 284 so as to assist the weight of the parts in insuring that the roll 290 follows its cam.

It is preferable to clamp the web to the cutting block 280 on each side of the knife while the cutting is taking place. For this purpose a series of rubber grips 295 (Figs. 5, 8, 9, 13, and 14) are mounted upon the upper ends of rods 296 attached to a bar 297. The bar is independent of the knife carrier in its movement, but is guided by a pair of rods 298 (Figs. 5 and 8) extending downwardly from the latter carrier and passing freely through holes formed in the bar 297. Springs 299 are attached to the bar 297 at each end and also to the stationary brackets 286. When the elevator is up these springs support the bar in the position of Fig. 9, upward movement of the bar being restrained by contact with the carrier 284. When the elevator descends the cutting block 280 will bring the web adjacent the grips 295. At about the same time the knife will rise to sever the web, and will immediately retract. The length of the flap b can be changed by varying the time of release of the knife, and therefore the rubber grips. Since the package is being pushed onto the elevator at this time a delay in releasing the grips will result in causing the sheet to slip around the article, increasing the length of flap b.

As the articles and their wrappers are pushed onto the elevator they meet a backing plunger, the article contacting face of which is formed as a plate 300 removable to permit replacement as the length of the article changes. This plate is secured by a stud and nut connection 301 (Fig. 26) to a slide 302. This slide is held to the central section 103 of the elevator platform 105 by guides 303 (Figs. 4 and 26) which hold its rear end for free sliding movement. Aligned slots 304 and 305 are formed in the slide 302 and in the central elevator platform 103 respectively, through which passes an arm 306 which acts to limit the free sliding movement of the slide on the platform and to perform certain other functions to be described. The arm 306 is fixed on a shaft 307 supported on the slide, and is free to turn and to cause corresponding rotation of the shaft. A lug 308 (Figs. 3 and 26) extending from the shaft is attached to a spring 309 stretched to the forward end of the slide. On the ends of the shaft are rearwardly extending arms 310 overlying headed friction pads 311 extending through holes in the slide and bearing against the upper surface of the plate 103. As the arms 310 swing downwardly against the pads as in Figs. 26 and 27, they press the pads against the plate 103 and exert a braking action on the slide. When the arms are raised the slide is free to move forward and back on the elevator except when restrained by other means now to be described.

The mechanism for operating the backing plunger, which also serves as an ejecting plunger, is not carried by the elevator, but at both its receiving and delivery stations the slide is moved by some agency located at the respective station. At the article receiving station the slide is of course moved rearwardly by the article under the influence of the plunger 80. At its delivery station the slide is moved by an ejector arm 315 (Figs. 1, 2 and 27) bearing a roll 316 at its end and fixed on the shaft 126. On one end of this shaft (Fig. 2) is an arm 318 joined by a link 319 with a rocker 320. This rocker is pivoted on the shaft 257 previously described, and has its lower end slotted at 321 to receive a block 322 carried by a crank 323 on the shaft 88. By this drive the active movement of the arm 315 is compressed within considerably less than half a cycle, which is an advantage in securing the proper relative timing of the parts.

There are several features of this article ejecting mechanism that are novel and require special attention. The start of the ejecting operation is shown in Fig. 27, where the elevator is just reaching its uppermost position and the arm 315 is swinging forward. Shortly after the position shown in this figure the roll 316 contacts with an abutment 324 on the rear of the backing plunger slide 302. As the ejector arm swings forward it moves the slide to the position of Fig. 28, in which the article contacting plate 300 has been moved well beyond the edge of the elevator and above the web 252 which serves as an extension of the delivery channel.

It should be noted that even though the backing plunger is carried entirely by the elevator, it moves in its ejecting movement beyond the edge of the elevator so as to position the article well on the delivery channel. The elevator cannot, of course, descend with the ejecting plunger in that condition, and as the elevator has a very rapid downward stroke, special provision has to be made in order to avoid mechanical interference. Some measure of protection in this respect is obtained from the fact that the roll 246 and the web 252 act as a part of the delivery channel, and these parts are rapidly swung down out of the way as shown in Fig. 29 as the elevator is about to begin its downward stroke. The main reliance for getting the backing plunger out of the way, however, is the very rapid rearward movement which this plunger possesses by reason of the fact that this movement is accomplished by spring 309 instead of by lever operated means.

As the ejecting arm 315 reaches the full line position of Fig. 28, in which it has forced the backing plunger to the forward limit of its motion, it does not reverse its stroke, but continues to the dotted line position in which the roll 316 has been raised clear of the abutment 324. In the forward movement of the backing plunger the arm 306 has been brought to the end of the slot 305 and has accordingly been arrested in its movement, rotating the shaft 307 and stretching the spring 309. The arms 310 which are also carried by the shaft 307 are, by the same cause, raised clear of the friction pads 311. As soon as the roll 316 passes the top of the abutment 324 the force resisting the tension of spring 309 is removed, and the whole backing plunger slide 302 is pulled rearwardly on the elevator by the pressure of arm 306 on the end of slot 305. During the first part of this movement the slide is unrestrained and the travel is therefore very rapid. As the slide reaches a position where its article contacting face is in substantial alignment with the forward edge of the elevator, the arms 310 come into contact with the friction pads 311 and bring the slide gradually to rest. The slide is now out of danger of striking parts of the machine during the descent of the elevator. When the elevator reaches its lowermost position and an article is forced onto it the slide 302 is still restrained by the friction pads, and will be moved rearwardly by the article under some resistance so that a tight wrap is secured.

The wrapper folding appliances will now be considered. As the article is moved onto the elevator (Fig. 26) one side of the article contacts with the area c of the wrapper and a flap b is folded underneath the article by contact with the elevator plate 105. The top of the article is covered by a flap d which is laid down by a roller 330 extending across the elevator as shown in Fig. 3 and mounted on arms 331 pivoted to the elevator frame at 332 (Figs. 13, 14, 26 and 27). A bracket 333 is mounted on each pivot 332 and is adjustably coupled to each arm by a stud and slot connection 334. Attached to each bracket 333 is a roll 335 adapted to contact with a stationary cam 336 attached to each vertical elevator guide 107. These cams raise the roll 330 slightly when the elevator is in article receiving position, so that there will be no interference with the incoming article; at other times permitting the rolls 335 to drop against stops 337 which hold the roll 330 substantially in engagement with the top of the article. The roll 330 is not primarily intended as a tensioning device, as this function is accomplished by the grip on the wrapper maintained by the rolls 245 and 246, but acts mainly to insure the smooth and regular formation of the top flap d.

As the article is first placed on the elevator the opposite end tucks are formed by a pair of folders 340 (Figs. 3, 4 and 26) each supported on a bracket 341 pivoted at 342 to the elevator frame. The pivots extend through slots 343 (Fig. 3) in the elevator frame 106 and are secured in place by nuts 344 (Fig. 14). Each bracket 341 bears an arm 345 having pivoted to it a slotted block 346 loosely straddling a plate 347. Each plate 347 is journaled at one end in a central bracket 348 on the elevator frame, and at the other end on the frame itself. As the plates are rocked the folders 340 will be swung from the tilted position of Fig. 3 to a position in which they closely embrace the sides of the article. By using the slotted block and plate connection this movement of the folders is made independent of their lateral adjustment on the elevator. To rock the folders an arm 350 (Figs. 13 and 14) is secured to the outer end of each of the plates 347, bearing at its end a roll 351. These rolls are pressed against stationary cams 352, secured to the elevator guides 107, by springs 353. When the elevator is down the folders separate as in Fig. 3. As soon as the elevator starts to rise, however, the rolls 351 will leave the cams 352 and the folders will close upon the package to tighten the folds. It is preferred to make the folders V-shaped in cross section, as shown best in Fig. 4. This both increases their rigidity and reduces the friction of the folders on the wrapper.

As the articles with the wrapper partially folded around them are carried by the elevator into alignment with the delivery channel, the outstanding upper end flaps are folded down by stationary folders 360 (Fig. 1). Each of these folders is carried on a bracket 361 mounted on rods 362 running longitudinally alongside of the delivery channel, the rods being supported on brackets 363 adjustably mounted on the rod 128 previously described and a similar one 128' further down the delivery channel. Folders 364 and 365, forming respectively the front and bottom end folds, are also secured to the rods 362 by brackets 366 and present between them the usual upwardly inclined slots 367 along which the lower end flaps travel. Guide plates 368 are also held by brackets 366 in position to guide the ends of the completely wrapped package during the heat sealing of its end flaps. Heaters 370 (Fig. 2) of the usual electrical type are preferably provided for the folders 360, 364 and 365, the plate 117, and the guides 368. The articles are pushed down the channel by contact one with another, until they reach a supporting belt 371 and side belts 372 suitably mounted, and driven by a chain connection 373 from the shaft 88. It is preferred to use two belts 372, one above the other, as this gives somewhat greater flexibility in dealing with articles of irregular contour.

In Fig. 30 is shown a modification which is of utility in increasing the range of sizes of the articles which may be wrapped. In this case the roll 246 is replaced by a similar roll 246' on an arm 251' pivoted on shaft 250 in the same way as arm 251 but being somewhat shorter in length. The arm 251' is rocked by an arm 254' operated by the link 255 previously described. Also coupled to the arms 251' and 254' at each side of the machine is an adjustable link 401 pivoted to one arm 402 of a bell crank mounted on shaft 244 and having a second arm 403. The arms 403 carry between them a roll 245' generally corresponding to the roll 245 but positioned somewhat nearer to the elevator. The rolls 245' and 246' are arranged to meet at about the center line of the gripper and move respectively down and up as indicated in dotted lines to permit the gripper to pass. In its full line position the roll 245' is higher than the roll 245 previously described and thus gives greater space under it for an article passing onto the elevator. Due to the placing of the roll nearer the elevator it clears the articles on the feeding in conveyor when it is in its dotted line position. The changed position of this roll is also found to be of advantage in smoothing out the feeding of the wrapper web.

Another modification has been illustrated in Figs. 31 to 34. In this case the abutment 324 on the backing plunger has been replaced by a member 410 pivoted to the slide 302 at 411 and possessing a range of oscillation limited by contact of a stop member 412 at each side with the sides of lugs 413 and with abutments 414. Normally the member 410 is held with its stops in contact with the lugs 413 by springs 415 stretched between the lugs and ears 416 on the member. The roll 316 strikes a contact surface 417 on the member and tilts the latter into the position of Fig. 32. As the roll continues to oscillate it passes onto the slanting top 418 of the member as in Fig. 33 and finally releases the member entirely, allowing it to spring back to its normal position. The roll will then on its return stroke hit the front side of the member as in Fig. 34 and will return the backing plunger to a position where it is clear of the delivery channel in case the normal spring return of the plunger fails to function for some reason. This modification thus serves as a safety measure, and will secure a positive return of the backing plunger to a definite position.

The preferred mechanism has been described in considerable detail for purposes of clearness, and without intending to limit the scope of the invention to the exact form shown. An attempt has been made at the same time to indicate the main features of novelty and the fundamental principles in which the machine differs from others previously proposed. These features and principles will now be defined in the following claims.

I claim:

1. In a wrapping machine having an article delivery channel, an elevator having an article supporting plate and vertically reciprocable from an article receiving station to a position in alignment with the delivery channel, means for guiding a web of wrapping material across the elevator below the article supporting plate, a reciprocating gripper receiving the leading end of the web from said guiding means and movable to draw the web past and to one side of the elevator, and means for severing wrappers from the web; a stationary roll on one side of the gripper path, a movable roll, and means for moving the movable roll periodically between a position in contact with the stationary roll and a position on the opposite side of the gripper path.

2. In a wrapping machine having an article delivery channel, an elevator having an article supporting plate and vertically reciprocable from an article receiving station to a position in alignment with the delivery channel, means for guiding a web of wrapping material across the elevator below the article supporting plate, a reciprocating gripper receiving the leading end of the web from said guiding means and movable to draw the web past and to one side of the elevator, and means for severing wrappers from the web; a stationary roll on one side of the gripper path, a guide roll positioned on the elevator substantially at the edge of the article supporting plate, a movable roll, and means for moving the movable roll into contact with the guide roll when the elevator is in substantial alignment with the delivery channel to grip the trailing end of a wrapper extending from a partially wrapped article on the elevator and to permit the gripper to pass between the movable and the stationary rolls, and then into contact with the stationary roll to restrain and guide the web.

3. In a wrapping machine having an article delivery channel, an elevator having an article supporting plate and vertically reciprocable from an article receiving position into a position in alignment with the delivery channel, a web cutting block carried by the elevator below the article supporting plate, a reciprocating gripper movable to grasp the leading end of the web when the elevator is raised and to draw the web out beyond the elevator, and a cutter coacting with the cutting block when the elevator is lowered; a web guiding plate carried by the elevator below the article supporting plate, and means for moving said plate from a position presenting the web to the cutting block when the elevator is lowered to a position spaced from the cutting block and in alignment with the gripper when the elevator is raised.

4. In a wrapping machine having an article delivery channel, an elevator having an article supporting plate and vertically reciprocable from an article receiving position into a position in alignment with the delivery channel, a web cutting block carried by the elevator below the article supporting plate, a reciprocating gripper movable to grasp the leading end of the web when the elevator is raised and to draw the web out beyond the elevator, and a cutter coacting with the cutting block when the elevator is lowered; a web guiding plate carried by the elevator below the article supporting plate, and means for moving said plate from a position presenting the web to the cutting block when the elevator is lowered to a position spaced from the cutting block and in alignment with the gripper when the elevator is raised, said web guiding plate carrying a second plate spaced therefrom and engaging the upper side of the web.

5. In a wrapping machine having an article delivery channel, an elevator having an article supporting plate and vertically reciprocable from an article receiving position into a position in alignment with the delivery channel, a web cutting block carried by the elevator below the article supporting plate, a reciprocating gripper movable to grasp the leading end of the web when the elevator is raised and to draw the web out beyond the elevator, and a cutter coacting with the cutting block when the elevator is lowered; a web guiding plate carried by the elevator below the article supporting plate, and means for moving said plate from a position presenting the web to the cutting block when the elevator is lowered to a position spaced from the cutting block and in alignment with the gripper when the elevator is raised, said web guiding plate carrying a second plate spaced therefrom and engaging the upper side of the web, the gripper being provided with notches and the web guiding plates being provided with projections in alignment with the notches to guide the leading end of the web into the bite of the gripper irrespective of crumpling of the web end.

6. In a wrapping machine having an article delivery channel, an elevator having an article supporting plate and vertically reciprocable from an article receiving position to a position in alignment with the delivery channel, a web cutting block carried by the elevator below the article supporting plate, web guiding means on the elevator below the article supporting plate and a gripper movable to grasp the leading end of the web when the elevator is raised and to draw out the web beyond the elevator; a reciprocable cutter, and means for moving the cutter to coact with the cutting block when the elevator is lowered to sever a wrapper from the web.

7. In a wrapping machine having an article delivery channel and an article elevator movable from an article receiving position to a position in alignment with the delivery channel; a pair of pivots laterally adjustable on the elevator, side tuckers carried by said pivots, a pair of plates carried by the elevator on axes extending laterally of the elevator, arms coupled to said side tuckers and engageable with the plates in any position of adjustment of the pivots, arms connected to the plates and bearing cam rolls, and stationary cams positioned to contact with the rolls when the elevator is in article receiving position to rock said plates and thereby separate the side tuckers.

8. In a wrapping machine having an elevator provided with an article supporting plate and movable periodically from article receiving to article delivering position, a roll extending across the elevator at the article receiving side thereof spaced above the article supporting plate, and means for moving the roll further away from the plate as the elevator reaches its article receiving position.

9. In a wrapping machine having an elevator provided with an article supporting plate and movable periodically from article receiving to article delivering position, a pair of arms pivoted at the sides of the elevator upon axes extending transversely thereof, a wrapper draping roll carried by said arms and spaced above the article supporting plate at its article receiving side, cam rolls carried by the arms, and stationary cams mounted on the machine in position to contact with the cam rolls when the elevator reaches its article receiving position and thereby move said draping roll further away from the article supporting plate.

10. In a wrapping machine having a web supply, a reciprocating gripper for drawing the web from the supply, means for severing a wrapper from the web, and means for associating an article with the wrapper so cut; a rail cooperating with the gripper to open it, a rail operating arm bearing a cam roll, a cam engageable with the roll, a spring causing the cam roll to follow the cam and by its motion towards the axis of the cam to close the gripper, an article detecting arm, means for moving said arm periodically into or out of article detecting position, a latch engageable with the rail operating arm to prevent it from following its operating cam, connections between the latch and the detecting arm operable to cause the latch to be shifted into engagement with the rail operating arm in the absence of an article, and means for resetting the latch periodically.

11. In a wrapping machine having means for associating an article and a wrapper, a movable gripper operable to grasp the end of a web and to draw out a length thereof, means for presenting the web to the gripper including spaced sets of aligned fingers engageable with opposite sides of the web, said gripper being provided with cut away portions clearing said fingers, and means for severing wrappers from the drawn out web.

12. In a wrapping machine having an article delivery channel, an elevator having an article supporting plate and vertically reciprocable from an article receiving station to a position in alignment with the delivery channel, means for guiding a web of wrapping material across the elevator below the article supporting plate, a reciprocating gripper receiving the leading end of the web from said guiding means and movable to draw the web past and to one side of the elevator, and means for severing wrappers from the web; a pair of rolls located on opposite sides of the gripper path and means for moving the rolls together substantially on the line of web travel to grasp and guide the web between them, and then moving the rolls apart to permit the gripper to pass between them.

13. In a wrapping machine having means for associating an article and a wrapper, a movable gripper operable to grasp the end of a web and to draw out a length thereof, means for presenting the web to the gripper including spaced sets of aligned fingers engageable with opposite sides of the web, said gripper being provided with cut away portions clearing said fingers and having extensions adapted to enter between said fingers and to grasp the portion of the wrapper lying between them even though the end of the web possesses some crumpling or tendency to waviness, said grippers also being formed with interengaging notched and ribbed portions adapted to corrugate the end of the web and to enhance the positiveness of the engagement of the grippers therewith, and means for severing wrappers from the drawn out web.

NORMAN W. LYON.